United States Patent
Snekkenes et al.

(10) Patent No.: US 7,445,691 B2
(45) Date of Patent: Nov. 4, 2008

(54) IMPREGNATION OF CHIPS WITH AN ACID LIQUID PRIOR TO A SULPHATE PULPING PROCESS

(75) Inventors: Vidar Snekkenes, Karlstad (SE); Krister Olsson, Karlstad (SE)

(73) Assignee: Metso Fiber Karlstad AB, Karlstad (SE)

( * ) Notice: Subject to any disclaimer, the term of this patent is extended or adjusted under 35 U.S.C. 154(b) by 368 days.

(21) Appl. No.: 10/551,100

(22) PCT Filed: Mar. 25, 2004

(86) PCT No.: PCT/SE2004/000454

§ 371 (c)(1),
(2), (4) Date: Sep. 26, 2005

(87) PCT Pub. No.: WO2004/092478

PCT Pub. Date: Oct. 28, 2004

(65) Prior Publication Data

US 2006/0213629 A1 Sep. 28, 2006

(30) Foreign Application Priority Data

Apr. 17, 2003 (SE) .................................. 0301162

(51) Int. Cl.
*D21C 3/02* (2006.01)
(52) U.S. Cl. .............................. 162/41; 162/9; 162/17; 162/18; 162/19; 162/38; 162/42; 162/59; 162/70; 162/76

(58) Field of Classification Search .................. 162/63, 162/9, 17, 18, 19, 38, 41, 42, 59, 68, 70, 162/76
See application file for complete search history.

(56) References Cited

U.S. PATENT DOCUMENTS

| | | | | |
|---|---|---|---|---|
| 3,841,962 A | * | 10/1974 | Procter et al. | 162/30.1 |
| 4,475,984 A | * | 10/1984 | Cael | 162/76 |
| 5,587,049 A | * | 12/1996 | Marzolini et al. | 162/40 |
| 6,203,662 B1 | * | 3/2001 | Snekkenes et al. | 162/17 |

OTHER PUBLICATIONS

Continuous Digester[downloaded online http://www.mediaviisi.fi/metsoautomation/neles/ApplicationReports/2611_Pulp/2611_02_01en.pdf], Metso Automation, Aug. 2003 [downloaded Jan. 2, 2007], whole document.*

* cited by examiner

*Primary Examiner*—Eric Hug
*Assistant Examiner*—Anthony J Calandra
(74) *Attorney, Agent, or Firm*—Rolf Fasth; Fasth Law Offices

(57) ABSTRACT

The method is for pre-treatment of chips that are fed to a sulphate cooking process. Through acidification of the chips in an acidic treatment fluid with a subsequent draining of free treatment fluid before subsequent steaming or wet-steaming, a high concentration of free hydrogen ions is established within the chip pieces. When the chips are subsequently formed into slurry with preferably a sulphide-rich alkali cooking fluid, $H_2S$ is formed locally in the chip pieces which gives a yield-increasing effect in the subsequent cooking step of 1-3%.

12 Claims, 2 Drawing Sheets

IMPREGNATION OF CHIPS WITH AN ACID LIQUID PRIOR TO A SULPHATE PULPING PROCESS

PRIOR APPLICATION

This application is a U.S. national phase application based on International Application No. PCT/SE2004/000454, filed 25 Mar. 2004, claiming priority from Swedish Patent Application No. 0301162-4, filed 17 Apr. 2003.

FIELD OF INVENTION

The present invention relates to a method for impregnation of chips with an acid liquid prior to a sulphate pulping process.

THE PRIOR ART

Several different methods are known in which acid pretreatment steps are used for chips.

A prehydrolysis for the chips, or another cellulose material such as bagasse or other annual plants, is sometimes used where one attempts to form saccharides under relatively stringent conditions, which saccharides are subsequently withdrawn from the chips.

The extracted fluid with the saccharides is subsequently used for other manufacture.

For example, U.S. Pat. No. 3,923,591 reveals such a prehydrolysis of annual plants, in which a special cooking process is subsequently to be used with, among other substances, bisulphite, with the aim of increasing the yield. In order to reach the necessary conditions for the prehydrolysis, temperatures of 160-199° C. (320-390° F.) are required.

U.S. Pat. No. 5,338,366 reveals a further variant of prehydrolysis in which a temperature of 160° C. (320° F.) is recommended (within the specified range 250-350° F./121-173° C.). In this case, principally annual plants (bagasse) are formed to a slurry in an acid fluid at a concentration of 8-12%, followed by dewatering to 35-50% with the aim of limiting the amount of steam required in the subsequent heating. The acid filtrate extracted by pressure is returned to the preceding slurry-formation step. The dewatered bagasse is then transferred to a heating step where the pulp is heated for 20-40 minutes under a pressure of 2-3.5 bar (30-50 psi). The prehydrolysis is thus complete.

In other known acid pretreatment steps, such as EP921228, the intention is to extract the metals from the chips, whereby the acid fluid with its dissolved metals is removed from the treatment step. This treatment means that a further acid filtrate must be handled in a destruction process or a recycling process, something that places a load on these processes.

It is also possible to treat the chips with $H_2S$ in gaseous form, with the aim of increasing yield. However, these processes suffer from disadvantages in that this gas is toxic and foul-smelling.

A method is revealed in SE506702 in which one attempts to achieve increased yield from the cooking process, in which sulphide-enriched impregnation fluid at a pH of 4-8, preferably 5-7, is allowed to impregnate the chips. Similar technology is also revealed in U.S. Pat. No. 3,841,962, where increases in yield of 6-7% are claimed, provided that the impregnation with $H_2S$-rich fluid takes place at 120-165° C. for 20-200 minutes and at a partial pressure of $H_2S$ of 10-80 psi, although this takes place at neutral pH 6-7.5. $H_2S$-rich treatment fluid is used in this case, something that also means that there is a risk for the release of $H_2S$ gases.

In most of these acid pretreatment steps, both the prehydrolysis steps and the metal-removal steps, the steps are terminated with the acid fluid in the chips mixture or fibre mixture being mixed or expelled with an alkali cooking fluid, which means that unnecessarily large quantities of alkali fluid are required solely for neutralising the acid chips mixture, or that the alkali fluid accompanies the expelled acid fluid away from the step. This gives an uneconomic handling of the process fluids and filtrates, which cannot be efficiently used in the process, and which require special recycling or destruction systems for the filtrates.

AIM AND PURPOSE OF THE INVENTION

The principal aim of the invention is to obtain increased yield from the cooking process in which the chips can be enriched with $H_2S$ without experiencing the disadvantages that known acid pretreatment steps involve.

The process does not require the extremely high temperatures that prehydrolysis steps requires and the aim is not to prehydrolyse the pulp, which prehydrolysis involves the hemicellulose (principally, but a certain fraction of the cellulose is also involved) being converted to pentoses (five-carbon sugars) (or to hexoses/six-carbon sugars in the case of the cellulose). The current process is to avoid such conversion, such that the hemicellulose and the cellulose remain in the pulp for optimal yield from the process.

The acid pretreatment step allows the acid pretreatment step to be a closed step, and no streams of acid filtrate are obtained. Acid pretreatment fluid is added essentially only in a quantity that is equivalent to the amount of acid fluid that accompanies the drained, acidified chips.

Nor is there any risk, in the absence of withdrawal of process fluid from the acid pretreatment, that yield loss is experienced, since the hemicellulose is prehydrolysed and becomes dissolved.

Nor does the cellulose have sufficient time to be degraded in the relatively mild conditions and short retention times.

None, or negligible amounts, of the toxic and foul-smelling gas $H_2S$ are formed in the acidification step.

$H_2S$ is formed essentially in the acidified chips once the alkali fluid has been added to the acidified, drained chip pieces. The alkali fluid with its content of sulphide then reacts with the hydrogen ions $H^+$ that remain in the chip pieces, whereby $H_2S$ is formed essentially solely when it is to be present in order to provide a yield-enhancing effect.

Extensive tests with $H_2S$-enriched chips show that an increase in yield of just over 1-3% can be obtained from the cooking step in an industrial sulphate cooking process, and that the yield can be further increased under certain favourable conditions one or a few more percentage points.

DETAILED DESCRIPTION OF PREFERRED EMBODIMENTS

Figure 1:
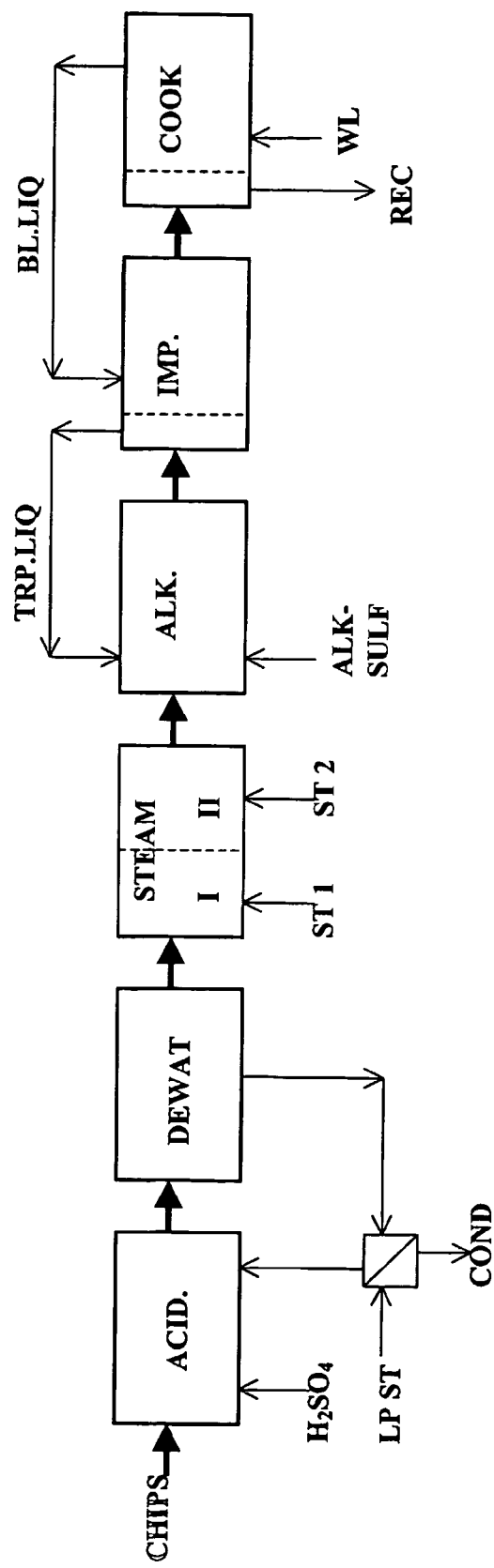
FIG. 1 shows schematically how the method according to the invention can be applied in a process for the manufacture of sulphate pulp.

The principle of the method according to the invention for pre-treatment of chips that are fed into a sulphate cooking process is shown in FIG. 1, where the steps ACID and DEWAT constitute a modification of the process that in other respects is the conventional process.

The chips that are obtained after the chip cutter occupy a large volume in which chips only occupy ⅓ of the volume, the remaining ⅔ being air. Only ⅓ of the chip piece itself is constituted by wood, the remaining part of the chip is constituted by ⅓ chip moisture and ⅓ air.

The chips CHIPS are normally heated with steam as the first measure, which can tale place in at least one step STEAM I/STEAM II. The untreated chips are conventionally fed to a chip pocket that is at atmospheric pressure, or slightly pressurised STEAM I where low-pressure steam ST 1 is added in order not only to heat the chips but also to drive air out from the chips. The temperature of the chips on exit from the chip pocket normally lies at 80-100° C.

The heated chips are fed/sluiced after the chip pocket to a steaming vessel STEAM II where the chips are subject to a more severe steam treatment under pressure, in order to drive out any residual air that remains and in order to heat the chips by a further 10-20° C. to a chip temperature of 90-120° C.

It is typical for this heating process that the steam condensation from the steaming process reaches a pH of 4-5, since naturally occurring acids in the chips are released. Attempts have been made in certain systems to withdraw this acid condensate, since the subsequent slurry formation at the desired alkali pH in alkali cooking fluid or impregnation fluid is opposed.

The amount of this acid condensate, however, is so small that it is not normally economically justified to invest in pumps, etc., in order to withdraw the acid condensate, and such systems are extremely prone to clogging. For this reason, it has been the rule in conventional systems to allow this acid condensate to accompany the chips to the subsequent alkalisation step ALK.

After the steaming step, the chips are formed to a slurry with the alkali impregnation fluid ALK_SULF before the cooking step in the digester. The slurry formation is shown schematically in FIG. 1 in the step ALK-SULF, which may correspond to a conventional chute or to a steaming vessel, which chute forms the first part of a transport flow to the first digester vessel. The chips are formed to a slurry in the chute such that they can be pumped, for onwards transport to the digester vessel either through a sluice feed (high-pressure tap) or directly using pumps.

The transport flow may consist in a conventional manner of a high-pressure tap with a pressurised flow towards the digester and a low-pressure flow towards the chute. A top separator may be present in the high-pressure flow at the top of the first digester vessel, which top separator withdraws the major part of the transport fluid TRP.LIQ and returns it to the chute and the slurry-forming process. A first impregnation of the chips can be established in this manner with a specific fluid in the transport flow.

It is then appropriate that the cooking step can be carried out in a one-vessel system or in a two-vessel system, in which the chips are impregnated in a first step IMP with the black liquor BL.LIQ that has been withdrawn from the cooking step. The black liquor that is withdrawn from the cooking step normally has a residual alkali content of 10-60 g/l of effective alkali, and following addition in a first step, the remaining alkali is consumed down to a level of approximately 5-20 g/l. This exhausted black liquor is subsequently withdrawn after the impregnation and before the cooking step to the recovery system REC. New cooking chemicals in the form of white liquor WL are batchwise added to the cooking process following the withdrawal of the exhausted black liquor.

The cooking process that is schematically shown corresponds to a cooking process that is preceded by a black liquor impregnation. However, other cooking processes such as conventional cooking (without black liquor impregnation), LO-SOLIDS (with continuous withdrawal from the cooking process of released organic material), or COMPACT COOKING (with high levels of released organic materials in the cooking step and with a high initial fluid/wood ratio) can, naturally, be used.

The two first steps ACID and DEWAT are characteristic of the invention. Chips are formed to a slurry, according to the invention, in the ACID step in an acidic treatment fluid, which forms a mixture of chips and acidic treatment fluid with a fluid fraction that exceeds 50% and preferably exceeds 80%.

Sufficient acidic pretreatment fluid must be present such that the interstices between chip pieces can be essentially fully filled. Since the chip volume in the packed state allows ⅔ parts of free air between the chip pieces, a fluid fraction of 66% (excluding chip moisture and the air inside the chip pieces) allows the chips to be fully immersed, and including the chip moisture (⅓ of the chips), just over 11% is added, giving a total fluid fraction of approximately 77%.

The acidified chips are to be drained following the slurry-forming step in a step DEWAT such that the drained chips obtain a remaining free fluid fraction that does not exceed 10% and that preferably does not exceed 5% (including the chip moisture, +11%, i.e. a total fluid fraction that does not exceed 21% and preferably 16%), after which the drained chips are heated by steam.

The acidic treatment fluid has a pH that does not exceed 4-5, and sulphuric acid ($H_2SO_4$), acetic acid or another acid with a high concentration of free hydrogen ions can be used as a suitable acidic treatment fluid. Since the chips are well-acidified before the steaming step, the chips will already be acidic at the start of the steaming step, and release of the naturally occurring acids in the chips reinforces the process such that a high concentration of free hydrogen ions is established within the chip pieces.

It is appropriate that the acid treatment fluid $H_2SO_4$ is added in a treatment vessel at a replacement amount that corresponds to the amount that accompanies the chips to the subsequent heating by steam. The treatment vessel can, for example, have the design revealed in SE518789, where a simple fluid trap is used in front of the chip pocket in order to prevent the release of NCG gases. The acidic treatment fluid can in this way be used in the fluid trap and the subsequent drainage step takes place at the outlet with a draining transport screw upwards from the fluid trap to the inlet to the chips pocket.

A continuous withdrawal of acidic treatment fluid from the treatment vessel is not necessary, and any metals that are released rapidly reach an equilibrium with the chips, and the metal content of the chips is not influenced to any significant degree. Release of acidic treatment fluid takes place continuously in the form of the amount that accompanies the chips, despite all precautions. Perfect drainage of the chips is impossible, even if all free fluid were to be withdrawn. Even if all air has not been expelled from the chips, a certain fraction of the acidic treatment fluid will penetrate the chips and expel/dilute to a certain extent the chip moisture that is present in the chips.

In order for the greatest possible amount of $H_2S$ to be formed within the chip pieces, sulphide-rich liquor should constitute the alkali impregnation fluid. "Sulphidity" is a relative measure of the amount of available sulphide, where sulphidity is given by the relationship:

Sulphidity=$Na_2S/(Na_2S+NaOH)$.

A second measure of the amount of sulphide in the fluid can be expressed as the molarity, or mol/litre fluid.

Even normal white liquors that are used in the cooking process contain small amounts of sulphide. Normal white liquor usually has a sulphidity of 30-40% with an $HS^-$ molarity of 0.5 mol/litre.

The liquors, however, can be enriched in a number of ways. For example, a more sulphide-rich white liquor can be produced with the aid of processes such as the CHEMREC-process. Black liquor is preferably withdrawn from the initial phase of the cooking procedure, and has a high sulphidity of approximately 60-80%. This black liquor can be used to a greater or lesser degree. Conventional black liquor, however, has a low molarity of $HS^-$, around 0.15-0.25 mol/litre.

Black liquor, however, suffers from the disadvantage that it contains released lignin, and this lignin can be reprecipitated onto the fibre, an effect known as lignin condensation, particularly under the acidic conditions that are prevalent in the acidic slurry-forming step.

It is advantageous for an optimal formation of $H_2S$ in the chip piece that the concentration of NaOH is limited, while the concentration of $HS^-$ is maintained at a high level. This is due to the fact that the OH ions diffuse more easily into the chips, and compete with the diffusion of the HS ions. Thus the alkali fluid that diffuses into the chips directly after the acidification should not consist of pure white liquor, with a high concentration of NaOH.

It is thus appropriate that the alkali impregnation fluid is constituted by a mixture of at least one of sulphide-rich white liquor, sulphide-rich black liquor, and/or sulphide-rich green liquor, and that the alkali impregnation fluid has a molarity of $HS^-$ that exceeds 0.15 mol/litre, preferably one that exceeds 0.25 mol/litre.

For an optimal diffusion of $HS^-$, the alkali impregnation fluid should also have a molarity of NaOH that does not exceed 0.75 mol/litre, preferably one that does not exceed 0.5 mol/litre.

When the sulphide-rich liquor penetrates the chip pieces, the sulphide reacts with the hydrogen ions present in the chip pieces, and $H_2S$ is formed in situ in the chip pieces.

It is appropriate that formation of a slurry with the chips in the acidic treatment fluid at the step ACID takes place during a period of 1-30 minutes, preferably 5-10 minutes.

The acidic treatment fluid used in the step ACID is placed under an external flow through a heat exchanger in order to heat the acidic treatment fluid to a temperature that exceeds 20° C. while not exceeding 80° C., preferably 40-60° C. The drained acidic fluid is shown in FIG. 1 passing the heat exchanger, where heat exchange takes place with the low-pressure steam LP ST or with a somewhat heated process water. Large quantities of filtrate are normally available in a digesting plant, which filtrate is normally at a temperature of approximately 75-85° C., and this is fully sufficient to provide a certain amount of heating of the chips before the steam treatment.

Figure 2:
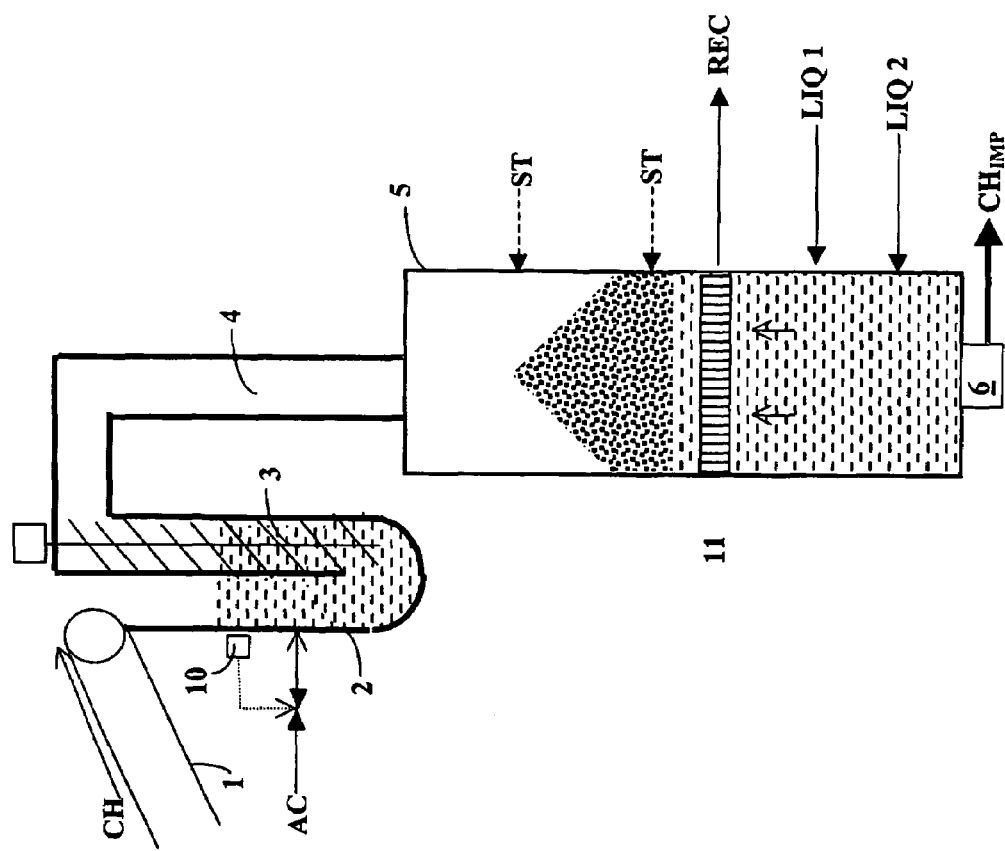
FIG. 2 shows an alternative process according to the invention in which the chips are heated by wet-steaming.

An alternative process is shown in FIG. 2 that can heat the chips essentially without the addition of steam. The chips CH in this case are led via a transport belt 1 to a pretreatment vessel 2, similar to that in SE518789, that is similar to a water trap. Acidic fluid AC is added in this vessel in sufficient quantity to maintain the level (as detected by the sensor 10). The chips after impregnation with acidic fluid are fed upwards with a motor-powered transport screw and are transferred to a wet-steaming vessel 5. Warm alkali impregnation fluid LIQ1 is added in this wet-steaming vessel at a first upper addition point, and exhausted alkali impregnation fluid is withdrawn through a withdrawal strainer 11. A flow of alkali impregnation fluid that flows against the flow of chips in the vessel is in this way established in the vessel. This ensures that the amount of NaOH present in the alkali impregnation fluid is consumed to a certain extent, and the most advantageous conditions for the diffusion of $HS^-$ are established.

A hotter alkali impregnation fluid LIQ2 may be added at a second addition point. It is appropriate that LIQ1 maintains a temperature in the range 60-100° C., while LIQ2 maintains a temperature that is 10-20° C. higher.

In certain cases, a small amount of steam ST can be added at different positions in the wet-steaming vessel 5 as a support for the heating process.

Finally the wet-steamed chips, immersed in alkali impregnation fluid are fed out from the bottom of the wet-steaming vessel through the outlet 6 $CH_{IMP}$.

The invention can be varied in a number of ways within the framework of the attached claims. Other types of cooking process, for example, can be used, as has been previously pointed out. The cooking process may also be of the simplified type in which chips are fed by pumps between one or several steps without recycling of transport fluid (TRP-LIQ) and where the major part of the cooking fluid established in the cooking step is added at the slurry-formation position.

While the present invention has been described in accordance with preferred compositions and embodiments, it is to be understood that certain substitutions and alterations may be made thereto without departing from the spirit and scope of the following claims.

The invention claimed is:

1. A method for a pre-treatment of chips, comprising:
   exposing the chips to an acidic treatment device by adding an acidic treatment fluid to establish an acidic slurry having a fluid fraction exceeding 50%;
   draining an acidic fluid from the chips so that the drained chips obtain a remaining free acidic fluid fraction surrounding the chips that does not exceed 10% by volume excluding any chip moisture disposed inside the chips;
   heating the drained acidic fluid to a temperature in a temperature range of 20-80° C.;
   recycling the drained acidic fluid directly to the acidic treatment device without adding or removing substances from the drained acidic fluid;
   adding additional acidic treatment fluid to the acidic treatment device only in a replacement amount that corresponds to an amount of acidic fluid that is retained in the drained chips;
   heating the drained chips by steam to a first temperature; and
   heating the drained chips to a second temperature not exceeding 140° C. while adding an alkali impregnation liquid, the second temperature being higher than the first temperature.

2. The method according to claim 1 wherein the heating of the chips to the second temperature essentially takes place by an addition of warm alkali impregnation fluid.

3. The method according to claim 2 wherein the addition of the warm alkali impregnation fluid takes place in a vessel in which a flow of alkali impregnation fluid is formed in the vessel that flows in an opposite direction to a flow of the chips.

4. The method according to claim 1 wherein the heating of the chips to the first temperature takes place through an addition of steam to the chips in at least one step, after which the chips that have been heated with steam are formed into a slurry with the alkali impregnation fluid.

5. The method according to claim 1 wherein the acidic treatment fluid has a pH that does not exceed 4-5 and the acidic treatment fluid is added to a treatment vessel in an amount for replacement that corresponds to an amount that accompanies the chips to a subsequent heating by steam.

6. The method according to claim 5 wherein no continuous withdrawal of acidic treatment fluid takes place from the treatment vessel in excess of a loss of acidic treatment fluid that accompanies the chips.

7. The method according to claim 1 wherein the alkali impregnation fluid is constituted by a sulphide-rich liquor.

8. The method according to claim 7 wherein the alkali impregnation fluid is constituted by a mixture of at least one of sulphide-rich white liquor, sulphide-rich black liquor and/or sulphide-rich green liquor, and where the alkali impregnation fluid has a molarity of $HS^-$ that exceeds 0.15 mol/liter.

9. The method according to claim 8 wherein the alkali impregnation fluid has a molarity of NaOH that does not exceed 0.75 mol/liter.

10. The method according to claim 1 wherein a formation of a slurry of the chips in the acidic treatment fluid takes place during a period of 1-20 minutes.

11. The method according to claim 10 wherein the acidic treatment fluid in a vessel is subject to an external flow against a heat exchanger.

12. The method according to claim 1 wherein the chips are heated with steam in at least one step to the first temperature in a range of 80-120° C.

* * * * *